(12) United States Patent
Gudme et al.

(10) Patent No.: US 10,513,896 B2
(45) Date of Patent: Dec. 24, 2019

(54) METHOD OF INSTALLING AN UNBONDED FLEXIBLE PIPE

(71) Applicant: National Oilwell Varco Denmark I/S, Brondby (DK)

(72) Inventors: Jonas Gudme, Humlebaek (DK); Adam Rubin, Smorum (DK); Marie Haahr, Allerod (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 78 days.

(21) Appl. No.: 15/525,782

(22) PCT Filed: Nov. 9, 2015

(86) PCT No.: PCT/DK2015/050338
§ 371 (c)(1),
(2) Date: May 10, 2017

(87) PCT Pub. No.: WO2016/074681
PCT Pub. Date: May 19, 2016

(65) Prior Publication Data
US 2018/0298705 A1    Oct. 18, 2018

(30) Foreign Application Priority Data

Nov. 13, 2014  (DK) .................................. 2014 70692
Feb. 6, 2015    (DK) .................................. 2015 70070

(51) Int. Cl.
*E21B 17/01*  (2006.01)
*E21B 19/22*  (2006.01)
(Continued)

(52) U.S. Cl.
CPC .............. *E21B 19/22* (2013.01); *C23F 13/00* (2013.01); *E21B 17/01* (2013.01); *F16L 1/15* (2013.01);
(Continued)

(58) Field of Classification Search
CPC .......... E21B 19/22; E21B 17/01; E21B 17/15; F16L 1/15; F16L 11/081; F16L 58/00; F16L 2011/047
See application file for complete search history.

(56) References Cited

U.S. PATENT DOCUMENTS

| 4,818,298 A | 4/1989 | Shishkin |
| 8,689,423 B2 * | 4/2014 | Karabelas ............... F16L 11/08 29/523 |

(Continued)

FOREIGN PATENT DOCUMENTS

| EP | 1 492 936 B1 | 1/2005 |
| FR | 2 858 841 A1 | 2/2005 |

(Continued)

OTHER PUBLICATIONS

Denmark Search Report for PA 2015 70070 dated May 26, 2015.
(Continued)

*Primary Examiner* — Giovanna C Wright
*Assistant Examiner* — Yanick A Akaragwe
(74) *Attorney, Agent, or Firm* — Pearne & Gordon LLP

(57) ABSTRACT

The present invention relates to a method of installing an unbonded flexible pipe with a bore for transportation of fluid wherein the unbonded flexible pipe comprises an outer sheath, an inner sealing sheath inside the outer polymer sheath, an annulus between said outer sheath and said inner sealing sheath and at least one metallic armor layer comprising iron located in said annulus, wherein the method comprises filling at least a part of the annulus with a corrosion promoting liquid before or after installing the unbonded flexible pipe between a first installation and a second installation.

20 Claims, 5 Drawing Sheets

Figure 1:
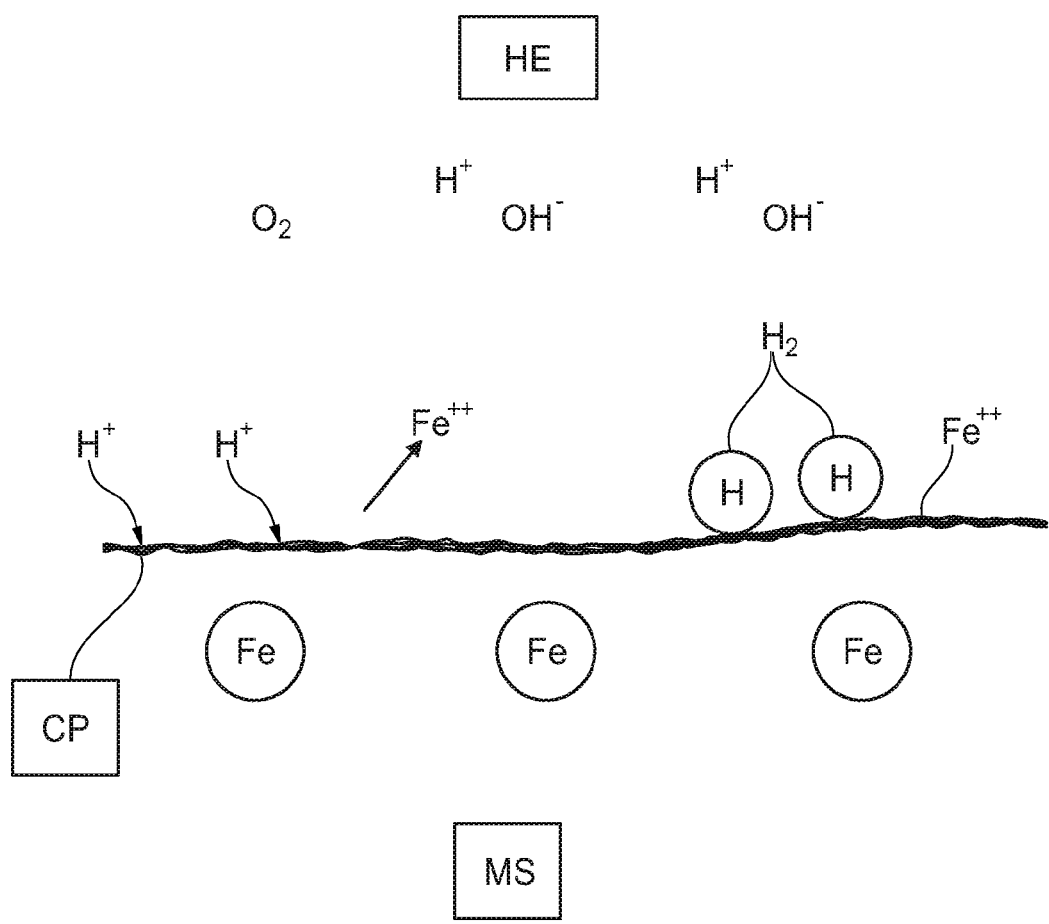

(51) Int. Cl.
*C23F 13/00* (2006.01)
*F16L 58/00* (2006.01)
*F16L 11/08* (2006.01)
*F16L 1/15* (2006.01)
*F16L 11/20* (2006.01)
*F16L 11/04* (2006.01)

(52) U.S. Cl.
CPC ........... *F16L 11/081* (2013.01); *F16L 11/083* (2013.01); *F16L 11/20* (2013.01); *F16L 58/00* (2013.01); *C23F 2213/22* (2013.01); *C23F 2213/31* (2013.01); *C23F 2213/32* (2013.01); *F16L 2011/047* (2013.01)

(56) References Cited

U.S. PATENT DOCUMENTS

| | | |
|---|---|---|
| 2003/0140977 A1 | 7/2003 | Berton |
| 2004/0177681 A1* | 9/2004 | Harthorn ................. E21B 17/01 73/152.57 |
| 2006/0278397 A1* | 12/2006 | Baten ..................... E21B 33/038 166/345 |
| 2011/0113884 A1 | 5/2011 | Marsden |
| 2011/0153225 A1 | 6/2011 | Mangal |
| 2013/0068464 A1 | 3/2013 | Critsinelis |
| 2013/0284296 A1 | 10/2013 | Berger |
| 2016/0097240 A1* | 4/2016 | Ren ........................... E21B 7/12 175/5 |

FOREIGN PATENT DOCUMENTS

| | | |
|---|---|---|
| GB | 2482610 B | 11/2013 |
| WO | 98/40657 A1 | 9/1998 |
| WO | 00/17479 A1 | 3/2000 |
| WO | 2011/026801 A1 | 3/2011 |

OTHER PUBLICATIONS

International Search Report for PCT/DK2015/050338 dated Feb. 2, 2016.
"Recommended Practice for Flexible Pipe"; ANSI/API Recommended Practice 17B, Fourth Edition; Jul. 2008; pp. 1-213.
"Specification for Unbonded Flexible Pipe"; ANSI/API Specification 17J, Third Edition; Jul. 2008; pp. 1-73.
Felix-Henry, "Prevention and Monitoring of Fatigue-Corrosion of Flexible Risers' Steel Reinforcements", Flexi France, Technip Group, Proceedings of the 26th International Conference on Offshore Mechanics and Arctic Engineering, Jun. 10-15, 2007, San Diego, CA, USA.

* cited by examiner

METHOD OF INSTALLING AN UNBONDED FLEXIBLE PIPE

The present invention relates to a method of installing an unbonded flexible pipe with a bore for transportation of fluid. The invention further relates to a subsea system comprising an unbonded flexible pipe and a first and a second installation wherein at least one of the first and the second installations is a subsea installation.

BACKGROUND OF THE INVENTION

Unbonded flexible pipes are frequently used as flexible risers or flexible flowlines for transport of fluid hydrocarbons such as oil and gas. The unbonded flexible pipes convey the fluids from a hydrocarbon reservoir located under the sea bed to a floating structure. The fluid may be a hydrocarbon fluid, such as natural gas or oil, depending upon the nature of the hydrocarbon reservoir, or an injection fluid such as water. The fluids, which are transported to the floating structure, can be processed, for example by compression and/or further treatment.

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an inner sealing sheath—often referred to as an internal pressure sheath, which forms a barrier against the outflow of the fluid which is conveyed in the bore of the pipe, and one or usually a plurality of armoring layers. Often the pipe further comprises an outer sheath or outer protection layer which provides mechanical protection of the armor layers. The outer protection layer may be a sealing layer sealing against ingress of sea water. In certain unbonded flexible pipes one or more intermediate sealing layers are arranged between armor layers.

In general flexible pipes are expected to have a lifetime of 20 years in operation.

The term "unbonded" means in this context that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass.

Natural gas is a useful fuel source, as well as being a source of various hydrocarbon compounds. It is often desirable to liquefy natural gas in a liquefied natural gas (LNG) plant at or near the source of a natural gas stream for a number of reasons. As an example, natural gas can be stored and transported over long distances more readily as a liquid than in a gaseous form because it occupies a smaller volume and does not need to be stored at a high pressure.

The Floating Liquefaction, Storage and Off-loading (FLSO) concept combines the natural gas liquefaction process, storage tanks, loading systems and other infrastructure into a single floating unit. The Floating Liquefied Natural Gas (FLNG) concept is similar to that of the FLSO concept, but additionally provides natural gas treatment as well as the liquefaction process, storage tanks, loading systems and other infrastructure into a single floating structure. Such concepts are advantageous because they provide off-shore alternatives to on-shore liquefaction plants. These vessels can be moored off the coast, or close to or at a gas field, in waters deep enough to allow loading of the LNG product onto a carrier vessel. They also represent movable assets, which can be relocated to a new site when the gas field is nearing the end of its productive life, or when required by economic, environmental or political conditions. When the floating structure is moored close to a gas field or other hydrocarbon reservoir, it can be kept in fluid communication with the producing well heads via one or more flexible risers. The one or more flexible risers are designed to convey fluids between the well heads of a hydrocarbon reservoir and the floating structure. Flexible risers may be configured as free-hanging catenaries or provided in alternative configurations, such as steep and lazy S and wave configurations, using buoyancy modules and tethered buoys. Thus, a flexible riser may be connected at one end to the floating structure, and at another end to a riser base manifold, which secures the flexible riser to the sea bed.

A subsea pipeline connects the riser base manifold to the well heads either directly, or via a well manifold. The subsea pipeline may be a metal or composite tubular flowline, or a flexible flowline comprising flexible pipe. In such configurations, a production hydrocarbon, e.g. natural gas, from a hydrocarbon reservoir, e.g. a gas field, passes along the subsea pipeline from one or more well-heads, which may be in the same or different hydrocarbon reservoirs, to the riser base manifold.

The riser base manifold is the point at which the production and any injection pipelines are connected to one or more flexible risers which convey the production hydrocarbon to the floating structure. The riser base manifold provides the touchdown point at which the flexible riser reaches the sea bed, and the riser base manifold may comprise an end fitting. Alternatively, the flexible riser reaches the sea bed at a touchdown point distant from the riser base manifold to which it is connected. The flexible risers may be connected to the floating structure at a hang-off point. The hang-off point may be at a side of the floating structure, or situated within a moonpool in the floating structure, for example at the bottom of a turret. The floating structure may be moored to the sea bed by a plurality of mooring lines which are anchored to the sea bed.

The flexible pipes used as flexible risers and flexible flowlines are frequently unbonded flexible pipes which are constructed of a number of independent layers, such as helically laid steel and polymeric layers formed around a central bore for transporting fluids. A typical unbonded flexible pipe comprises from the inside and outwards an inner armoring layer known as the carcass, an inner impermeable sheath surrounded by one or more armoring layers and an outer impermeable sheath. Thus, the inner impermeable sheath forms a bore in which the fluid to be transported is flowing. Moreover, the inner and the outer sheath form an annular volume, known as the annulus, which comprises one or more layers of armoring layers and an annular void. However, although the sheaths forming the annular volume in principle are impermeable, during time gases may pass through the sheaths into the annular volume. From the bore of the pipe gasses, such as $CO_2$ and $H_2S$, may permeate through the sheath into the annular volume and cause corrosion of the armoring layers in the annular volume, which are normally made from steel.

The paper titled "Prevention and monitoring of fatigue-corrosion of flexible risers' steel reinforcements" by Antoine Felix-Henry, OMAE2007-29186, published as part of the Proceedings of the 26$^{th}$ International Conference on Offshore Mechanics and Arctic Engineering, Jun. 10-15, 2007, San Diego, Calif., USA, discloses a flexible riser pipe comprising steel reinforcing layers contained in an annular volume located between inner and outer polymer sheathes.

The structure of the flexible riser is designed to seal and avoid any direct contact between the fluid carried in the bore and the steel reinforcing layers in the annular volume.

Although the inner and outer sheaths defining the annular volume are designed to be leak proof under high temperature and pressure conditions, small amounts of gases can permeate through the inner sheath from the riser fluid. Corrosive gases such as carbon dioxide, dihydrogen sulphide and water vapour may be present in a hydrocarbon production fluid in the bore. Such corrosive gases may diffuse into the annular volume and attack the steel reinforcing layers. OMAE2007-29186 discloses that a gas venting system can be integrated inside the flexible pipe end terminations to flush corrosive gases from the annular volume.

The annular volume may also accidentally be exposed to water, such as from seawater ingress from a damaged outer sheath, or water vapour diffusing from the bore fluids through the inner sheath and condensing in the annular volume, may result in the corrosion of the steel reinforcing layers. Such corrosion is normally undesired as it may result in a reduction in the fatigue life of the riser.

In addition, an annular volume exposed to water ingress may also prevent gas from being vented from the annulus, leading to a pressure build up which may result in a rupture in the external sheath and further corrosion issues.

In response to such ingress of water as a result of damage during use, OMAE2007-29186 discloses that subsea clamps may be installed in the flexible riser to seal the outer sheath at any damaged area and provide a gas release valve from the annular volume. The gas release valve can be applied to a "hog bend" region of the flexible riser. The "hog bend" represents a local maximum in the height of a sinusoidal- or wave-shaped flexible riser. The annular volume can then be injected with an inert fluid to mitigate against corrosion and extend the fatigue life of the flexible riser.

Such a method may result in the leakage of the inert fluid from the annular volume into the surrounding environment. If the inert fluid is not environmentally benign, this method of corrosion mitigation may be associated with a mild degree of environmental damage.

WO-9840657-A1 discloses a riser wherein the annulus is continuously flushed with a lower pressure medium, such as warmed gas or oil.

WO-00/17479 discloses a riser wherein the annulus is connected to the inner channel of the riser via a flow path to prevent over-pressure of the annulus. The flow path includes a one-way valve or a pump to allow fluid to flow from the annulus to the inner fluid channel, but not the other way around. The riser may include a further flow path to introduce fluids or gases in the annulus for cleaning and maintenance thereof.

FR-2 858 841 discloses a method for operating a riser. The method comprises injecting an entrainment gas under pressure in the annulus to force permeated gases in the annulus to flow along towards a vent, to be vented to the outside of the riser.

Under normal circumstances corrosion can be handled in flexible unbonded pipes, and an evenly distributed corrosion in the pipe is normally considered to be acceptable. However, if local conditions concentrate the corrosion to a localized zone, even a modest increased corrosion may have significant impact on local pipe properties and lead to damage.

DISCLOSURE OF INVENTION

An object of the present invention is to provide a method in which the corrosion of the metallic armoring layers in the annulus of an unbonded flexible pipe is controlled and local corrosion substantially avoided, hereby making the armoring layers resistant to local failure due to corrosion.

It is also an object of the present invention to reduce the occurrence of localized $H_2S$ damage such as hydrogen induced cracking (HIC) or sulfide stress cracking (SSC) so the metallic armoring layers in the unbonded flexible pipe remain functional during the expected service time of the unbonded flexible pipe.

The present invention seeks to ensure that increased corrosion in the metallic armouring layers in unbonded flexible pipes does not appear in local zones. The rate of corrosion should be distributed so the unavoidable corrosion appears with an evenly low rate on the armouring layers, and in such a way that increased local corrosion does not happen.

Thus, an object of the present invention is to control the corrosion of the metallic armoring layer by using a liquid which will initiate an even corrosion in the annulus and at the same time guard against localized $H_2S$ damage, hereby allowing the unbonded flexible pipe to remain functional during the expected service time.

As previously mentioned crude oil and natural gas may contain significant amounts of what is considered to be harmful gases, such as $H_2S$ and $CO_2$, in fact natural gas may contain up to 90% $H_2S$. These gases may migrate through the inner sealing sheath of an unbonded flexible pipe into the annulus of the pipe and eventually cause damage to the armoring layers located in the annulus due to corrosion.

When moisture or water is present at least three types of corrosion may appear in oil and gas field installations.

Corrosion caused by carbon dioxide is very common since $CO_2$ is present in almost all oil and gas fields. Carbon dioxide may react with iron and water to form the weak carbonic acid and soluble iron ions. In the process atomic hydrogen is generated which will combine into hydrogen gas.

$$CO_2 + H_2O \rightarrow HCO_3^- + H^+ \qquad \text{eq1}$$

$$Fe + 2H^+ \rightarrow Fe^{2+} + 2H^0 \qquad \text{eq2}$$

$$2H^0 \rightarrow H_2(gas) \qquad \text{eq3}$$

Corrosion caused by carbon dioxide is denoted "sweet corrosion" and is characterized by simply metal dissolution which leads to a reduction of the cross section of the armor layers leading to an increase in load in the remaining armor layer and this process may eventually lead to over-loading of the armor and rupture of the pipe. However, if it is possible to ensure that the amount of $CO_2$ which enters the annulus attacks the armor material evenly in a flexible pipe annulus, the resulting corrosion rate will be very small due to the large surface area available compared with the $CO_2$ flux rate. Flooding the annulus has surprisingly appeared to be one such method to ensure that the $CO_2$ corrosion rate is kept sufficiently low.

Another type of corrosion is "sour corrosion" caused by hydrogen disulfide which will function as an acid.

$$H_2S \rightarrow H^+ + HS^- \qquad \text{eq4}$$

$$HS^- \rightarrow H^+ + S^{2-} \qquad \text{eq5}$$

$$Fe^{2+} + S^{2-} \rightarrow FeS \qquad \text{eq6}$$

The reaction product iron sulfide is a fairly stable and harmless compound which will not cause any further corrosion.

However, the presence of hydrogen sulfide ($HS^-$) at the surface of the metallic armour layer functions as an inhibitor of gas formation of hydrogen, i.e. inhibiting two hydrogen atoms to form hydrogen gas (equation 3). Thus, a major part of the hydrogen atoms remain on the metallic surface and are able to penetrate into the microstructure of the metallic armor and cause embrittlement and cracking. Hydrogen embrittlement significantly reduces the fatigue properties of the armor material and in severe cases limits the design of a flexible pipe since cracking of the armor wires has significantly detrimental effect on the integrity of the pipes. In order to ensure that the pipe design is not at jeopardy from the sour cracking phenomena's (HIC/SSC), very low strength materials which are resistant to $H_2S$ are usually selected for the pipes. The sour cracking may also be suppressed if sufficient surface is actively corroding since the surface active HS− is spread over a larger area or if the $H_2S$ is quickly captured by the reaction the iron ions created from the $CO_2$ corrosion. The effect may be illustrated when combining equation 2-6:

$$Fe^{2+}+H_2S \rightarrow FeS+H_2(g) \qquad eq7$$

If a sufficient amount of $Fe^{2+}$ is available in equation 7, equilibrium is shifted far to the right as FeS is only marginally soluble. $H_2S$ is thus captured and transformed into FeS before it acts as the inhibitor for hydrogen formation (equation 3).

In addition to $CO_2$ corrosion and $H_2S$ corrosion, the armor material may also be exposed to oxygen ($O_2$) corrosion. Oxygen is not present in oilfields in any significant amount and replenishment of any oxygen in the annulus is therefore very often limited to oxygen entering the annulus from a breach in the outer sheath or entering from the venting ports. Oxygen will be present in an annulus free space since approximately 20% of the atmosphere consists of oxygen. The amount of inherent oxygen in the annulus is however very low and the full consumption of all oxygen by a corrosion process with the armor materials will cause only insignificant corrosion.

As a general rule the unbonded flexible pipes are produced in a dry environment and delivered to the place of use in a dry condition. However, in many applications of unbonded flexible pipes it is more or less impossible to avoid moisture or water in the annulus in which the amour layers are located. Water or vapour may diffuse through the internal pressure sheath into the annulus. In some cases water may also enter the annulus through the outer sheath.

Thus, as the ingress of water is not controllable, the presence of water may appear locally in the annulus and give rise to local corrosion in the annulus which is highly undesirable as it may cause severe damage.

Consequently, the present invention relates to a method of installing an unbonded flexible pipe with a bore for transportation of fluid wherein the unbonded flexible pipe comprises an outer sheath, an inner sealing sheath inside the outer polymer sheath, an annulus between said outer sheath and said inner sealing sheath and at least one metallic armor layer comprising iron located in said annulus, wherein the method comprises filling at least a part of the annulus with a corrosion promoting liquid before or after installing the unbonded flexible pipe between a first installation and a second installation.

The corrosion promoting liquid is a liquid which comprises at least 30% water. The corrosion promoting liquid may also comprise electrolytes, preferably in an amount from about 0.1% to about 8%. In an embodiment the corrosion promoting liquid comprises at least 50% water and at least 1% of the salts NaCl and/or KCl. The salt improves the water's ability to transport ions which enhances the effect of corrosion promoting liquid.

In an embodiment the corrosion promoting liquid is tap water. In another embodiment the corrosion promoting liquid is water, which has been added one or more salts, such as NaCl and/or KCl, such as in an amount from about 0.1% to about 8%, conveniently in an amount from about 1% to about 5%, suitable in an amount from about 1.5% to about 3.5%. In yet an embodiment the corrosion promoting liquid is sea water.

All percentages in this text are weight percent unless otherwise stated.

The corrosion promoting liquid comprises water serves to induce corrosion of the at least one armoring layer. The armoring layer is made from iron-containing steel and is susceptible to corrosion. The unbonded flexible pipe may comprise two, three, four or more armoring layers comprising iron in the annulus. Moreover, in the presence of the corrosion promoting liquid containing water, the iron in the armour layers may also be involved in chemical reactions with carbon dioxide and hydrogen sulfide which also corrode the armour layers.

However, the presence of the corrosion promoting liquid in the annulus ensures an evenly distributed effect of the oxygen, carbon dioxide and hydrogen sulfide present in the annulus, and thus and even distribution of corrosion, thereby harmful local corrosion is avoided.

According to the method the corrosion promoting liquid is filled into the annulus before or after installing the unbonded flexible pipe. In an embodiment the corrosion promoting liquid is filled into the annulus during production of the unbonded flexible pipe. The corrosion promoting liquid is filled into the annulus as one of the last steps in the production of the unbonded flexible pipe. In an embodiment the corrosion promoting liquid is tap water which is filled into the annulus just before the annulus is sealed off. The tap water is filled into the annulus under pressure from one end of the pipe and when the water flows out of the other end of the annulus, the space inside the annulus which is normally void, is considered to be filled with water functioning as corrosion promoting liquid.

In an embodiment the method comprises submerging the unbonded flexible pipe into sea water and connecting it to the first and the second installation for transporting fluid there between, where at least one of the first and the second installations is a subsea installation. In this embodiment the annulus of the unbonded flexible pipe is filled with corrosion promoting liquid when it is submerged into sea water. However, the corrosion promoting liquid may also be filled into the annulus after the unbonded flexible pipe has been submerged and connected to the first and the second installation. In such a case the corrosion promoting liquid may be sea water.

Both the first and the second installation may be a subsea installation, such as a well head and a connection point. However, one of the installations may also be a floating facility such as a floating production facility.

As previously mentioned the corrosion promoting liquid is preferably evenly distributed in the annulus.

Due to the even distribution of the corrosion promoting liquid in the annulus, the oxygen, carbon dioxide, hydrogen sulfide, and other gases which are absorbed and dissolved in the corrosion promoting liquid will also become evenly distributed in the part of the annulus which is filled with the corrosion promoting liquid. The part of the annulus filled with the corrosion promoting liquid may be the entire annulus or the part of the annulus considered to be most exposed to corrosion.

Thus, when the corrosion promoting liquid is filled into the annulus and the unbonded flexible pipe is installed for service, it is believed that several chemical processes are initiated which cause corrosion on the metallic armoring layers, among these processes are oxygen induced corrosion, and possible "sweet corrosion" and "sour corrosion". However, as the corrosion processes progress the oxygen dissolved in the corrosion promoting liquid is consumed by the corrosion processes. When the free oxygen in the corrosion promoting liquid is consumed and the content of oxygen is substantially zero, the rate of corrosion from this process decreases.

The fact that the corrosion rate slows down when the oxygen in the corrosion promoting liquid has been consumed in the corrosion processes, eventually leads to a situation where the rate of corrosion governed by the $CO_2$ corrosion process (equation 1-3) is low and stable and evenly distributed in the part of the unbonded flexible pipe filed with corrosion promoting liquid. Thus, the rate of corrosion can be kept at a level which is acceptable and by which the armoring layers remain functional during the expected service time of the unbonded flexible pipe.

The corrosion promoting liquid will initially induce an evenly distributed corrosion at a rate which is higher than if the armoring layers were placed in a dry and tempered environment. However, once the available oxygen dissolved in the corrosion promoting liquid in the annulus has reacted and the content of iron ions in the liquid has increased due to the corrosive reactions, the rate of corrosion will decrease and eventually become stable at a low level which is acceptable. Thus, in an embodiment no further oxygen is added to the annulus after the annulus has been filled with the corrosion promoting liquid.

The corrosion promoting liquid comprise electrolytes and in an embodiment the corrosion promoting liquid is sea water. In another embodiment the corrosion promoting liquid is water, which has been added one or more salts, such as NaCl or KCl.

The corrosion promoting liquid initiates a corrosion of the armoring layers. However, the rate of corrosion will is relatively low and evenly distributed throughout the annulus even when harmful gases, such as $H_2S$ and $CO_2$, are dissolved in the corrosion promoting liquid. Although the initial rate of corrosion will is relatively high until the available oxygen has been consumed, the rate of corrosion is eventually so low that the armoring layers will remain functional for about 20 years or more, i.e. the armoring layers will maintain sufficient strength to function as e.g. pressure armor or tensile armor in the unbonded flexible pipe during the expected service time of the pipe.

It is clear that the armor layers should be dimensioned to withstand the unavoidable corrosion which will appear according to the invention. However, as the corrosion is evenly distributed and controlled, the harmful local corrosion which appears in the prior art unbonded flexible pipes is avoided. Such local corrosion may in some cases destroy an unbonded flexible pipe within months or even weeks after installation.

When filled into the annulus the corrosion promoting liquid surrounds the armoring layers in the annulus and fills the voids not occupied by the armoring layers. In an embodiment at least 20%, such as at least 50%, conveniently 80% of the vacant space, i.e. the space not occupied by the armoring layers or other solid layers, in the annulus is filled with the corrosion promoting liquid. Naturally up to 100% of the annulus may be filled with the corrosion promoting liquid.

According to an embodiment the corrosion promoting liquid comprises a polar liquid, and in particular the corrosion promoting liquid is a polar protic solvent, such as water, which may further comprise a mono, di or tri alcohol, like methanol, ethanol or glycerine.

Consequently, the present invention comprises an embodiment in which the corrosion promoting liquid comprises water in excess of 50%. It has been found convenient that the corrosion promoting liquid comprises at least 60% water, more conveniently at least 75% water, and preferably at least 90% of water.

In an embodiment the corrosion promoting liquid comprises a Fe based salt. The addition of a Fe based salt increases the amount of iron ions in the corrosion promoting liquid, which will shift the equilibrium between the iron present in the armor layers and the corrosion promoting liquid, i.e. the steel in the armor layers will be less inclined to release iron ions into the liquid as the corrosion promoting liquid will be closer to be saturated with iron ions, due to the added Fe containing salt.

Moreover, the iron ions from Fe based salts dissolved in water also react with oxygen in the corrosion promoting liquid and form iron oxygen compounds. Thus, the Fe based salts also serve to bind oxygen in the corrosion promoting liquid.

The iron ions from Fe based salts also serve to bind sulfur ions from dissolved $H_2S$, and, in this respect, serve to remedy the problems of hydrogen induced cracking (HIC) or sulfide stress cracking (SSC).

The iron salts may e.g. be iron chloride, iron hydroxide or an iron salt from an organic acid. The iron salt should be dissolved relatively easy in the corrosion promoting liquid. The iron salt is added in an amount from about 0.1% to about 8%, suitable in an amount from about 0.5% to about 5%.

According to an embodiment the corrosion promoting liquid is filled into the annulus during the mounting of the unbonded flexible pipe between the first and the second installation. The first installation may be a floating production and storage unit floating on the sea, and the second installation may be e.g. a well head at the sea bed. The flexible unbonded pipe is connected with the first and the second installation via end fittings. The corrosion promoting liquid is in an embodiment filled into the annulus via the first and/or the second installation and in another embodiment via one or both of the end fittings.

Conventional end fittings are easily be adapted to allow a liquid to be filled into the annulus of the unbonded flexible pipe. Moreover, the end fittings are connected with a pumping device which pumps the corrosion promoting liquid into the annulus.

In normal operation the water in the corrosion promoting liquid in the annulus will only be supplemented or replaced by water diffusing from the bore into the annulus.

Although, as a general rule it is not desirable to replace the corrosion promoting liquid due to the fact that such a replacement of corrosion promoting liquid also replaces or replenishes the amount of oxygen in the annulus, which again leads to increased corrosion of the armor layers in the annulus, it may, however, in some special cases, e.g. when the level of diffusing $H_2S$ is high, be an advantage to replace at least a part of the corrosion promoting liquid. Replacement of the corrosion promoting liquid may be a batch wise process or a continuous process.

In an embodiment of the method according to the invention the outer polymer sheath comprises one or more openings. The openings may be in the form of valves which may be open to allow communication between the surrounding environment and the annulus or the valve may be closed.

In an embodiment the outer polymer sheath comprises a number of holes, which have valve members which only allow fluid to flow out from the annulus, but restrict liquid from flow into the annulus.

The embodiment is particular suitable when the unbonded flexible pipes are used for subsea connection and the corrosion promoting liquid comprises sea water. Thus, the sea water in the annulus is replaced by water diffusing into the annulus from the bore. The sea water in the annulus will also absorb gases, such as $H_2S$ and $CO_2$, and eventually the concentrations of the gases in the seawater will become relatively high, which leads to an undesirable high rate of corrosion. Thus, in such situations it is desirable to replace at least a part of the sea water in the annulus by letting the sea water in the annulus flow out into the surrounding sea water.

For the purpose of improving the distribution of the corrosion promoting liquid in the annulus the corrosion promoting liquid is transported through the annulus at least partly by means of a wick material. A wick material is a material which is capable of absorbing large amount of liquid and transports the liquid through the wick material. Examples of wick material comprise woven fabric of polyester, polyamide, polyurethane and combinations thereof or any other woven or nonwoven comprising a polar polymer. Furthermore the wick material may contain Fe fibers, hereby increasing the corrosive area during initial corrosion.

To ensure that the level of corrosion maintains an acceptable level, the method in an embodiment comprises measurement of the level of corrosion of the armoring layers in the annulus. The measurement may be a measurement on the gases leaving the annulus or an electrochemical measurement.

Consequently, by measuring the condition of the armoring layers in the annulus it is possible to ensure that the armoring layer will remain functional during the service time of the unbonded flexible pipe. In case it is found that the level of corrosion is too high, it is possible to change the conditions in the annulus, e.g. by replacing or modify the corrosion promoting liquid. The corrosion promoting liquid may be modified by addition of e.g. a salt or a corrosion inhibiting chemical. Thus, in an embodiment the annulus may partly be filled with a corrosion promoting liquid and partly filled with a corrosion inhibiting liquid. The liquids may be mixed or non-mixed depending on their polarity.

The invention also relates to a subsea system comprising an unbonded flexible pipe and a first and a second installation wherein at least one of the first and the second installations is a subsea installation. Moreover, the unbonded flexible pipe comprises a bore and is arranged to transport fluid between the first and the second installation and the unbonded flexible comprises an outer sheath, an inner sealing sheath inside the outer polymer sheath, and an annulus between said outer sheath and said inner sealing sheath. At least one metallic armoring layer is located in the annulus, and the annulus is at least partly filled with a corrosion promoting liquid.

The first and the second installation may both be subsea installations, such as a subsea production facility and/or a subsea collection and storage facility. One of the installations may also be a floating production and storage unit.

From the inside an out an embodiment of an unbonded flexible pipe comprises an armor layer known as the carcass and comprising an elongate strip wound to form a tube. The carcass is surrounded by an inner sealing sheath defining the bore. The inner sealing sheath is surrounded by at least one armoring layer, and finally an outer sealing sheath.

In the carcass the elongate strip is in most cases made from steel, in particular stainless steel. However, for some purposes the carcass is made from other materials, such as polymer material or composite materials.

The inner sealing sheath covers the carcass. The inner sealing sheath is constituted by an extruded layer of polymer material, such as polyethylene. Normally the inner sealing sheath is substantially impermeable to liquid.

The armoring layers, normally there is more than one layer, are referred to as pressure armors and tensile armors. The armoring layers are made from metal wires or strips wounded to form a tubular shape. The metal wires or strips are normally made from stainless steel.

The pressure armors are normally wound around the inner sealing sheath with an angle of almost 90° in respect of the axis of the pipe. The tensile armors are normally wound with an angle in the range of 45° to 65° in respect of the axis of the pipe.

The outer sheath is conveniently an extruded layer of polymer material, e.g. polyethylene. The outer sheath surrounds the armoring layers, which are located in the annulus formed between the inner sealing sheath and the outer sheath. However, the armoring layers do not entirely fill the annulus, which will have a void space which may be filled with liquid, such as the corrosion promoting liquid.

In an embodiment the corrosion promoting liquid is tap water. In an embodiment of the subsea system the corrosion promoting liquid is sea water. Sea water may be obtained for free, which makes the solution very cheap. Moreover, sea water comprises salts, e.g. NaCl, which makes it suitable as an electrolyte and sea water is a dipolar liquid. Thus, sea water has good properties in respect of serving as corrosion promoting liquid.

In an embodiment the corrosion promoting liquid also comprises a Fe based salt. The Fe based salt dissolves in liquid, such as water, and releases iron ions which will shift the equilibrium in liquid, and slow down the release of iron ions from the metallic surface. The added iron ions may also react with oxygen and react with sulfur ions and form less soluble salts. In this way the Fe based salt serves to inhibit the corrosive effect of $H_2S$. The Fe based salt is e.g. added to sea water, e.g. when the sea water is filled into the annulus of the unbonded flexible pipe.

To obtain an even distribution of the corrosion promoting liquid the annulus in an embodiment comprises a wick material. The wick material is constituted of one or more layers in the annulus, or one or more bands extending in the annulus in the longitudinal extension of the unbonded flexible pipe. The wick material is intended to absorb the corrosion promoting liquid and transport it through the annulus of the unbonded flexible pipe and release the liquid to voids in the annulus. In an embodiment the wick material comprises iron, such as iron fibers. The iron in the wick material releases iron ions into the corrosion promoting liquid which will shift the equilibrium in favor of the metallic armoring layers, i.e. reduce the corrosion on the metallic armoring layers.

In an embodiment of the subsea system the outer sheath comprises one or more holes, preferably said holes comprise valves. The holes serves to replace corrosion promoting liquid if required or to adjust the pressure in the annulus.

DETAILED DESCRIPTION OF THE INVENTION

Figure 2:
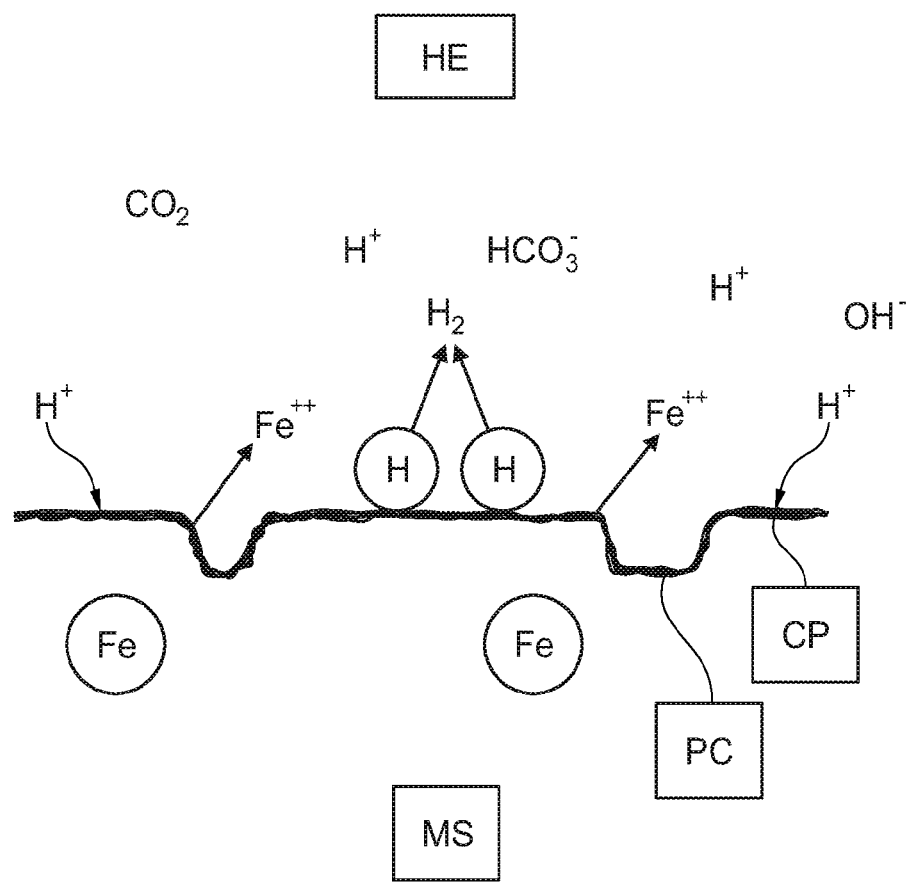
Figure 3:
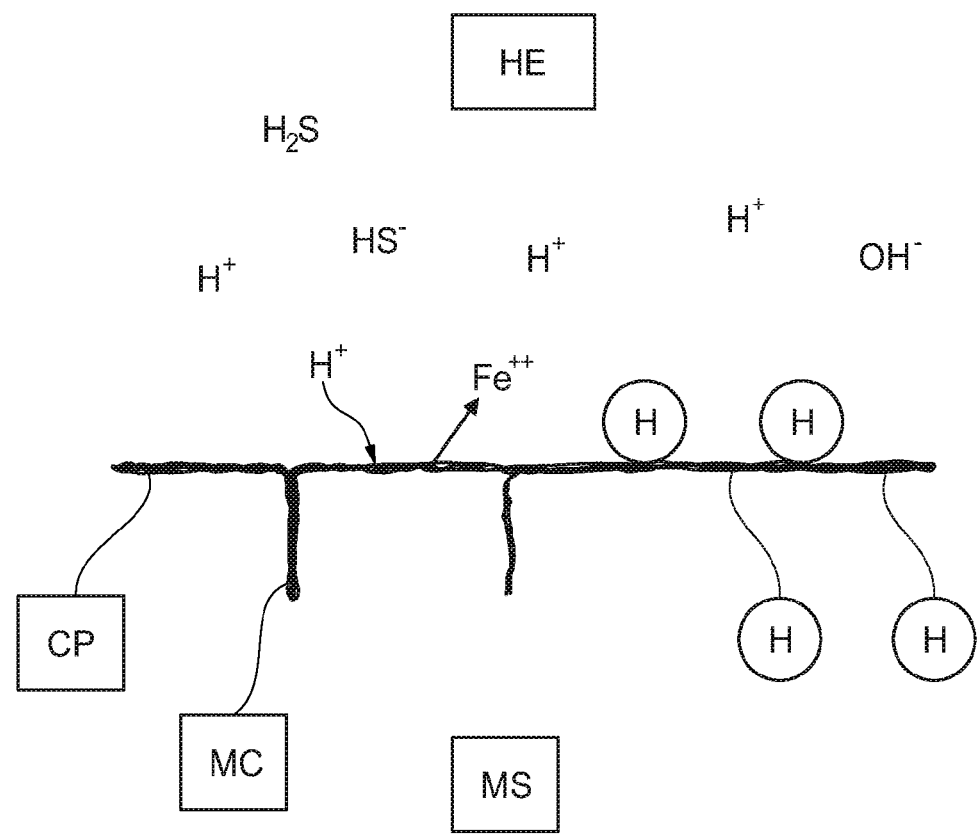
Figure 4:
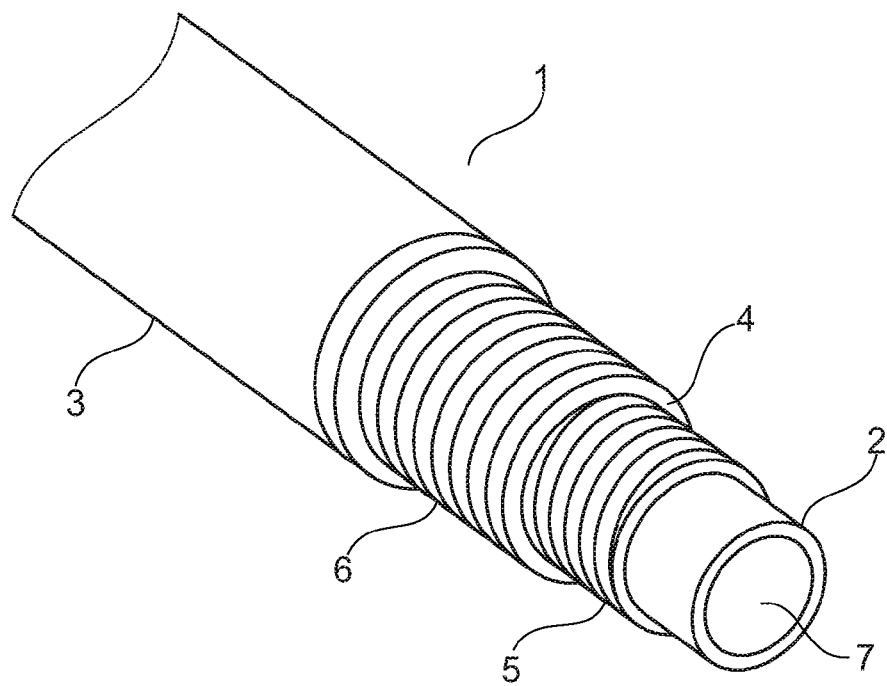
Figure 5:
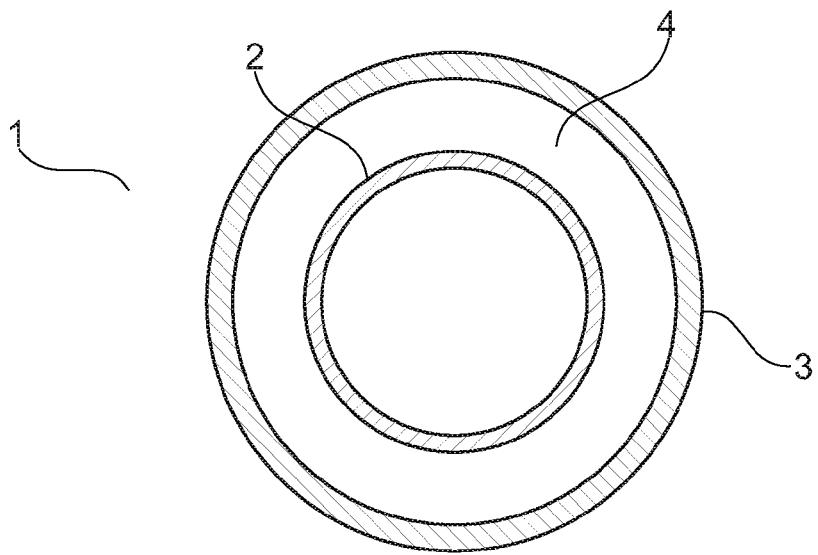
Figure 6:
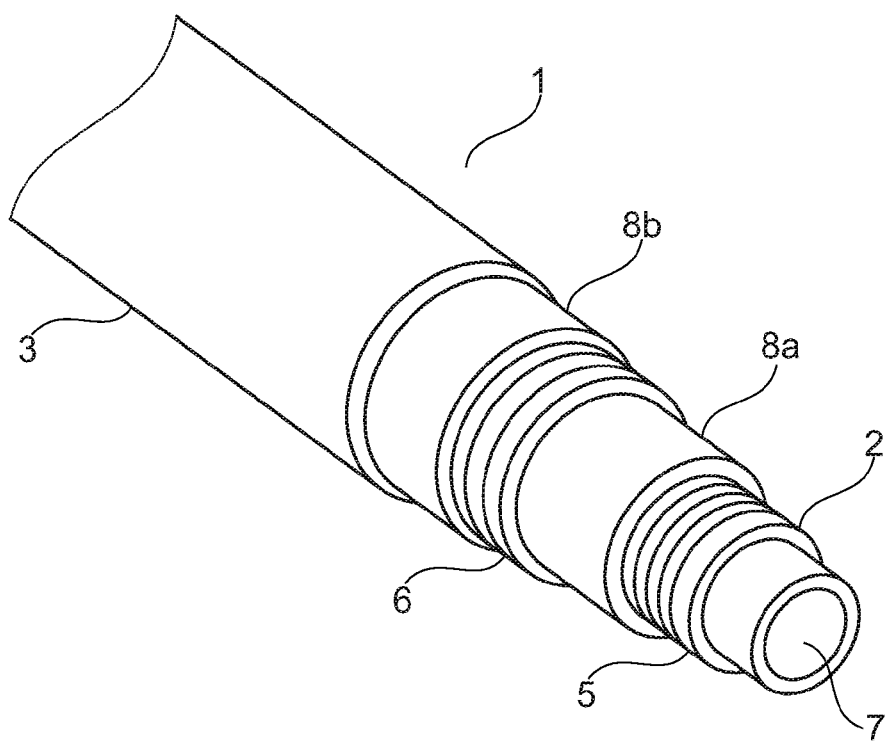

The invention will be explained more fully below in connection with a preferred embodiment and with reference to the drawings in which:

FIG. 1 shows the principles of corrosion;
FIG. 2 shows the principles of "sweet corrosion";
FIG. 3 shows the principles of "sour corrosion";
FIG. 4 shows an embodiment of an unbonded flexible pipe;
FIG. 5 shows the annulus in an unbonded flexible pipe; and
FIG. 6 shows an unbonded pipe with wick material.

The drawings are only schematical and only intended for showing the principles of the present invention. Details which do not form part of the invention have been omitted. The same reference numbers are used for the same parts in the drawings.

FIG. 1 illustrates the principles of "simple" corrosion at a metallic surface MS in contact with water and oxygen present in the humid environment HE. The surface of the metal is corroded due to the metallic irons reaction with acid (hydrogen ions) and the iron on the surface is dissolute. An instable corrosion product CP of iron oxides and iron hydroxides is formed during the reaction.

FIG. 2 illustrates the principles of "sweet corrosion" in which the acid is carbonic acid formed by the reaction between water and carbon dioxide. The initial corrosion corresponds to the "simple" corrosion of the surface MS. However, gradually the "sweet corrosion" will turn into pitting corrosion PC.

FIG. 3 illustrates the principals of "sour corrosion". The hydrogen sulfide functions as an acid which will cause a simple corrosion on the metallic surface MS. However, the hydrogen sulfide also functions as an inhibitor for hydrogen gas formation. This has the consequence that a large amount of hydrogen atoms remain on the metallic surface and are able to enter the metallic surface at boundaries in the crystalline surface. This again leads to micro cracks MC which are detrimental to the metallic structure.

Due to the invention the humid environment will not only appear in a local part in the annulus, but will extend through the entire annulus whereby it is possible to minimize the incidents of "sweet corrosion" and "sour corrosion" which are the more severe types of corrosion.

FIG. 4 shows the principles of an unbonded flexible pipe 1 which is used for transportation of fluid according to the invention. The unbonded flexible pipe 1 comprises an inner sealing sheath 2 and an outer polymer sheath 3. The inner sealing sheath 2 and the outer polymer sheath 3 define the annulus 4 in which the two armoring layers 5 and 6 are located. The inner sealing sheath 2 also defines a bore 7 in which the fluid is transported. In this embodiment the unbonded flexible pipe comprises two armoring layers 5 and 6, however, in other embodiments the unbonded flexible pipe may comprise other numbers of armoring layers, e.g. three or four armoring layers. A typical unbonded pipe comprises four armoring layers, i.e. two pressure armoring layers and two tensile armoring layers. The armoring layers are made of metal, such as duplex steel. The inner sealing sheath and the outer polymer sheath are made from a polymer material, such as polyethylene. In this embodiment the inner surface of the inner sealing sheath is not supported by a carcass, i.e. the inner sealing sheath is self-supporting. However, embodiments of unbonded flexible pipes comprising carcasses are also within the scope of the invention.

FIG. 5 is a section of an unbonded flexible pipe 1 showing the annulus 4 formed between the inner sealing sheath 2 and the outer polymer sheath 3. The annulus 4 comprises the armoring layers, however, even if the armoring layers fill must of the annulus, there will still be voids in the annulus which may be filled with gas originating from the fluid to be transported and which gas has permeated the inner sealing sheath. According to the method a corrosion promoting liquid is filled into the annulus and the liquid will fill the voids in the annulus and dissolve the gases present in the voids.

In an example where the gases are $H_2S$ and $CO_2$ and the corrosion promoting liquid is sea water, the gases will be dissolved in the sea water, and, thus, the gases will become less harmful in respect of corrosion. The sea water will still cause the stainless steel in the armoring layers to corrode, however, the progress of the corrosion will be so slow that the armoring layers will be able to maintain a sufficient strength during the service time of the unbonded flexible pipe. It will also be possible to frequently fill fresh sea water into the annulus to replace sea water with dissolved gases, which will decrease the concentration of gases in the sea water.

FIG. 6 shows an alternative embodiment of an unbonded flexible pipe 1 suitable for use according to the invention. This pipe comprises an inner sealing sheath 2, an outer polymer sheath 3 forming an annulus there between, which annulus comprises the armoring layers 5 and 6 and further comprises two layers 8a and 8b of wick material. The wick material will absorb the corrosion promoting liquid, when it is filled into the annulus and transport the liquid through the annulus and ensure that voids will be filled with liquid and optional gases are dissolved in the liquid.

What is claimed is:

1. A method of installing an unbonded flexible pipe with a bore for transportation of fluid wherein the unbonded flexible pipe comprises an outer sheath, an inner sealing sheath inside the outer polymer sheath, an annulus between said outer sheath and said inner sealing sheath and at least one metallic armor layer comprising iron located in said annulus, wherein the method comprises
   filling at least a part of the annulus with a corrosion promoting liquid to control a distributed corrosion of the at least one metallic armor layer, the filling being before or after installing the unbonded flexible pipe between a first installation and a second installation.

2. A method according to claim 1, further including filling the corrosion promoting liquid into the annulus during production of the unbonded flexible pipe.

3. A method according to claim 1, further including submerging said unbonded flexible pipe into sea water and connecting it to the first and the second installation for transporting fluid there between, where at least one of the first and the second installations is a subsea installation.

4. A method according to claim 1, further including evenly distributing the corrosion promoting liquid in the annulus.

5. A method according to claim 4, wherein the corrosion promoting liquid is evenly distributed through the annulus at least partly by means of a wick material.

6. A method according to claim 1, further including filling at least 20% of the annulus with the corrosion promoting liquid.

7. A method according to claim 1, wherein the corrosion promoting liquid is a polar liquid.

8. A method according to claim 1, wherein the corrosion promoting liquid comprises a Fe based salt.

9. A method according to claim 1, further including distributing the corrosion promoting liquid through the annulus at least partly by means of a wick material.

10. A method according to claim 1, further including filling the corrosion promoting liquid into the annulus via the first and/or the second installation and/or via end fittings.

11. A method according to claim 1, further including measuring the level of corrosion of the armoring layers in the annulus.

12. A method according to claim 1, further including filling at least 80% of the annulus with the corrosion promoting liquid.

13. A method according to claim 1, wherein corrosion promoting liquid includes water.

14. A subsea system comprising an unbonded flexible pipe and a first and a second installation wherein at least one of the first and the second installations is a subsea installation, said unbonded flexible pipe comprises
a bore, said unbonded flexible pipe being arranged to transport fluid between said first and said second installation via the bore;
an outer sheath;
an inner sealing sheath inside the outer polymer sheath;
an annulus between said outer sheath and said inner sealing sheath; and
a metallic armor comprising iron located in said annulus, wherein the annulus is at least partly filled with a corrosion promoting liquid to control a distributed corrosion of the metallic armor.

15. A subsea system according to claim 14, wherein the corrosion promoting liquid includes water.

16. A subsea system according to claim 14, wherein said annulus further includes a wick material.

17. A subsea system according to claim 16, wherein the wick material includes one or more layers in the annulus.

18. A subsea system according to claim 16, wherein the wick material includes one or more bands extending in the annulus in the longitudinal extension of the unbonded flexible pipe.

19. A subsea system according to claim 16, wherein the wick material includes iron fibers.

20. A subsea system according to claim 14, wherein the corrosion promoting liquid includes a Fe based salt.

* * * * *